United States Patent
Zhang et al.

(10) Patent No.: US 12,309,379 B2
(45) Date of Patent: May 20, 2025

(54) METHOD FOR PROCESSING VIDEO FRAME, METHOD FOR TRAINING MODEL, ELECTRONIC DEVICE, AND STORAGE MEDIUM

(71) Applicant: Beijing Baidu Netcom Science Technology Co., Ltd., Beijing (CN)

(72) Inventors: Xu Zhang, Beijing (CN); Le Shi, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 104 days.

(21) Appl. No.: 18/075,867

(22) Filed: Dec. 6, 2022

(65) Prior Publication Data

US 2024/0007639 A1   Jan. 4, 2024

(30) Foreign Application Priority Data

Jun. 30, 2022   (CN) .......................... 202210778599.6

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/172* (2014.11); *H04N 19/177* (2014.11)

(58) Field of Classification Search
None
See application file for complete search history.

(56) References Cited

U.S. PATENT DOCUMENTS

| | | | |
|---|---|---|---|
| 2002/0163966 A1* | 11/2002 | Ramaswamy | ... H04N 21/23406 375/E7.176 |
| 2007/0153892 A1* | 7/2007 | Yin | ...... H04N 19/124 375/E7.181 |

(Continued)

FOREIGN PATENT DOCUMENTS

| CN | 102630013 A | 8/2012 |
|---|---|---|
| CN | 104780367 A | 7/2015 |

(Continued)

OTHER PUBLICATIONS

May 19, 2023—(EP) European Extended Search Report—App. No. 22212075.0.

(Continued)

*Primary Examiner* — Edemio Navas, Jr.
(74) *Attorney, Agent, or Firm* — Banner & Witcoff, Ltd.

(57) ABSTRACT

Provided are a video frame processing method, a model training method, a device and a storage medium, relates to a field of artificial intelligence, and in particular, to cloud computing, video processing, and medium cloud technology, and may be applied in an intelligent cloud scenario. The video frame processing method includes: acquiring a target characteristic corresponding to a current video frame in a video frame sequence to be encoded, in the case of the video frame sequence to be encoded satisfies a preset condition; inputting the target characteristic corresponding to the current video frame to a first target model, to obtain a first output result corresponding to the current video frame; and determining a first target group of pictures (GOP) length corresponding to the current video frame, based on the first output result corresponding to the current video frame.

15 Claims, 8 Drawing Sheets

(51) Int. Cl.
*H04N 19/172* (2014.01)
*H04N 19/177* (2014.01)

(56) References Cited

U.S. PATENT DOCUMENTS

2013/0208813 A1    8/2013    Argyropoulos et al.
2021/0064884 A1*  3/2021    Elgamal ............... H04N 19/177

FOREIGN PATENT DOCUMENTS

| CN | 106973066 A | 7/2017 |
|----|-------------|--------|
| CN | 110392284 A | 10/2019 |
| CN | 112019850 A | 12/2020 |
| CN | 112911299 A | 6/2021 |
| EP | 3021579 A1 | 5/2016 |
| WO | 2021072694 A1 | 4/2021 |

OTHER PUBLICATIONS

Jan. 13, 2023—(CN) First Office Action—App. No. 202210778599.6.

Thao Nguyen Thi Huong, et al."ArtificialIntelligence Based Adaptive GOP SizeSelection for Effective Wyner-Ziv VideoCoding", 2018 International Conference on Advanced Technologies for Communications, 978-1-5386-6542-8/18/ $31.00 © 2018 IEEE.

* cited by examiner

METHOD FOR PROCESSING VIDEO FRAME, METHOD FOR TRAINING MODEL, ELECTRONIC DEVICE, AND STORAGE MEDIUM

CROSS-REFERENCE TO RELATED APPLICATIONS

The present application claims priority to Chinese Patent Application No. CN 202210778599.6, filed with the China National Intellectual Property Administration on Jun. 30, 2022, the disclosure of which is hereby incorporated herein by reference in its entirety.

TECHNICAL FIELD

The present disclosure relates to a field of artificial intelligence, and in particular, to cloud computing, video processing, and medium cloud technology, which may be applied in an intelligent cloud scenario.

BACKGROUND

A group of pictures (GOP) length is usually fixed in a high efficiency video coding (HEVC) encoder, but in some scenarios, the fixed GOP length may lead to lower encoding quality. Therefore, a method is urgently needed to solve the above problem.

SUMMARY

The present disclosure provides video frame processing method and apparatus, model training method and apparatus, a device and a storage medium.

According to a first aspect of the present disclosure, provided is a video frame processing method, including: acquiring a target characteristic corresponding to a current video frame in a video frame sequence to be encoded, in the case of the video frame sequence to be encoded satisfies a preset condition; inputting the target characteristic corresponding to the current video frame to a first target model, to obtain a first output result corresponding to the current video frame; and determining a first target group of pictures (GOP) length corresponding to the current video frame, based on the first output result corresponding to the current video frame.

According to another aspect of the present disclosure, provided is a model training method, including: selecting a GOP length sample corresponding to a video frame sample in a target video frame sequence sample from at least two first preset GOP lengths; obtaining label data of the video frame sample, based on the GOP length sample corresponding to the video frame sample; and taking a preset characteristic of the video frame sample and the label data of the video frame sample as training data, the training data being used to train a first preset model to obtain a first target model.

According to another aspect of the present disclosure, provided is a video frame processing apparatus, including: a first acquisition unit configured to acquire a target characteristic corresponding to a current video frame in a video frame sequence to be encoded, in the case of the video frame sequence to be encoded satisfies a preset condition; a first determination unit configured to input the target characteristic corresponding to the current video frame to a first target model, to obtain a first output result corresponding to the current video frame; and a second determination unit configured to determine a first target GOP length corresponding to the current video frame, based on the first output result corresponding to the current video frame.

According to another aspect of the present disclosure, provided is a model training apparatus, including: a third determination unit configured to select a GOP length sample corresponding to a video frame sample in a target video frame sequence sample from at least two first preset GOP lengths; a fourth determination unit configured to obtain label data of the video frame sample, based on the GOP length sample corresponding to the video frame sample; and a model processing unit configured to take a preset characteristic of the video frame sample and the label data of the video frame sample as training data, the training data being used to train a first preset model to obtain a first target model.

According to another aspect of the present disclosure, provided is an electronic device, including: at least one processor; and a memory connected in communication with the at least one processor. The memory stores an instruction executable by the at least one processor, and the instruction, when executed by the at least one processor, enables the at least one processor to execute any method of embodiments of the present disclosure.

According to another aspect of the present disclosure, provided is a non-transitory computer-readable storage medium storing a computer instruction thereon, and the computer instruction is used to cause a computer to execute any method of the embodiments of the present disclosure.

According to another aspect of the present disclosure, provided is a computer program product including a computer program, and the computer program implements any method of the embodiments of the present disclosure, when executed by a processor.

As such, the solution of the present disclosure solves a problem of reduced encoding quality due to an existing fixed GOP length, and realizes adaptive adjustment of the GOP length.

It should be understood that the content described in this part is not intended to identify key or important features of the embodiments of the present disclosure, nor is it used to limit the scope of the present disclosure. Other features of the present disclosure will be easily understood by the following description.

BRIEF DESCRIPTION OF THE DRAWINGS

The accompanying drawings are used to better understand the present solution, and do not constitute a limitation to the present disclosure.

DETAILED DESCRIPTION

Figure 1:
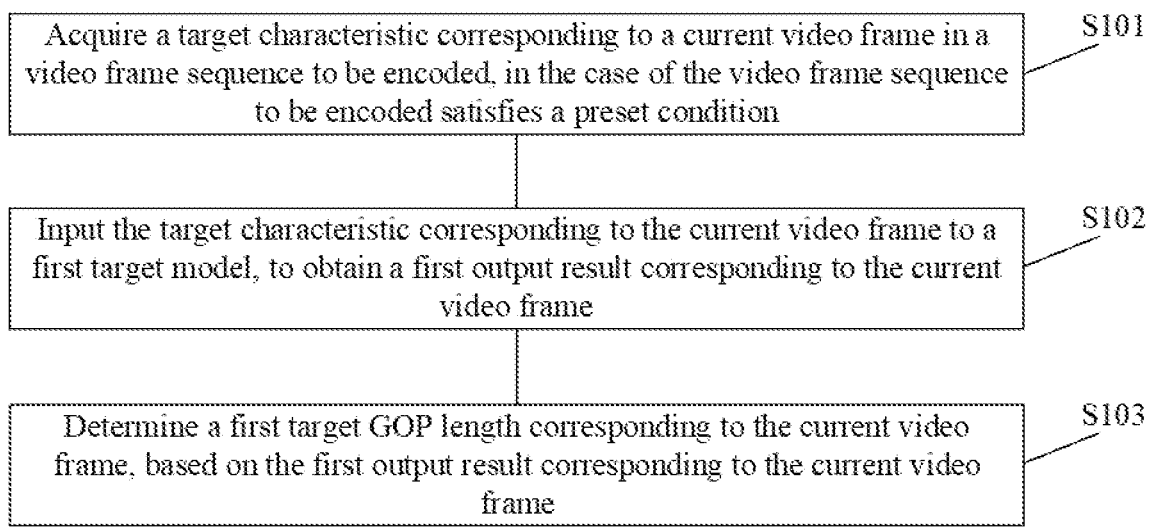
FIG. 1 is a first schematic diagram of an implementation flow of a video frame processing method according to the embodiments of the present disclosure.

Hereinafter, descriptions to exemplary the embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope and spirit of the present disclosure. Likewise, for clarity and conciseness, descriptions of well-known functions and structures are omitted in the following descriptions.

The term "and/or" herein only describes an association relation of associated objects, which indicates that there may be three kinds of relations, for example, A and/or B may indicate that there is only A exists, or there are both A and B exist, or there is only B exists. The term "at least one" herein indicates any one of many items, or any combination of at least two of the many items, for example, at least one of A, B, or C may indicate any one or more elements selected from a set of A, B, and C. The term "first" and "second" herein indicate a plurality of similar technical terms and use to distinguish them from each other, but do not limit an order of them or limit that there are only two items, for example, a first feature and a second feature indicate two types of features/two features, a quantity of the first feature may be one or more, and a quantity of the second feature may also be one or more.

In addition, in order to better illustrate the present disclosure, numerous specific details are given in the following specific implementations. Those having ordinary skill in the art should be understood that the present disclosure may be performed without certain specific details. In some examples, methods, means, elements and circuits well known to those having ordinary skill in the art are not described in detail, in order to highlight the subject matter of the present disclosure.

Hereinafter, a brief introduction is made to related concepts involved in the solution of the present disclosure.

In the high efficiency video coding (HEVC) technology, a video frame sequence composed of several time-continuous pictures may be firstly segmented into several groups of pictures (GOPs) when it is being compressed. At this time, a quantity of video frames included in a GOP is called a GOP length. The HEVC is classified into closed GOPs and open GOPs. The closed GOPs mean that each GOP starts with an instantaneous decoding refresh (IDR) frame, and respective GOPs are encoded independently. The open GOPs mean that the first intra coded picture in the first GOP is an IDR frame, and the first intra coded picture in a subsequent GOP is non-IDR; that is, an inter coded picture in the subsequent GOP may use a picture which has been encoded in a previous GOP as a reference picture with passing over the non-IDR picture.

Herein, all IDR frame are I-frames. In other words, in a GOP, the first frame is the I-frame, an intermediate frame is a B-frame, and the last frame is a P-frame. As such, determining of the GOP length is equivalent to determining of a quantity of B-frames in the GOP. For example, if the quantity of B-frames is 7, the GOP length is a sum of 7 B-frames and 1 P-frame, that is 8 frames, or the GOP length is a sum of 7 B-frames, 1 P-frame and 1 I-frame, that is 9 frames.

The I-frame, also known as an intra picture, is composed of macroblocks predicted within the frame. The P-frame is a forward prediction encoding frame predicted from the B-frame or I-frame front of it. The B-frame is a bidirectional difference frame referring frames that appear before and after it; that is, the B-frame records differences between itself and the previous and subsequent frames.

Based on the above introduction, the solution of the present disclosure provides a video frame processing method. Specifically, FIG. 1 is a first schematic diagram of an implementation flow of the video frame processing method according to the embodiments of the present disclosure. The method may be alternatively applied to electronic devices, such as a personal computer, a server, a server cluster, or the like, which is not specifically limited by the solution of the present disclosure. Furthermore, the method includes at least part of the following contents. As shown in FIG. 1, the method includes the followings.

In step S101, a target characteristic corresponding to a current video frame in a video frame sequence to be encoded is acquired, in the case of the video frame sequence to be encoded satisfies a preset condition.

Herein, the preset condition may be set based on an actual need, which is not limited by the solution of the present disclosure.

In step S102, the target characteristic corresponding to the current video frame is inputted to a first target model, to obtain a first output result corresponding to the current video frame.

In step S103, a first target GOP length corresponding to the current video frame is determined based on the first output result corresponding to the current video frame.

As such, the solution of the present disclosure predicts the first target GOP length corresponding to the current video frame by using the first target model which has been trained in advance, so that a problem of reduced encoding quality due to an existing fixed GOP length is solved, and adaptive adjustment of the GOP length is realized. In particular, with respect to a sequence relevant to large scenario fluctuations, the solution of the present disclosure enables a better encoding performance.

In a specific example, a mapping relationship between an output result and a GOP length may be established in advance, so that the first target GOP length indicated by the first output result is determined based on the mapping relationship. Alternatively, the first target GOP length may be directly obtained based on the first output result.

In another specific example, the first target model is a pre-trained model. For example, the first target model may be a classification model, at this time, a quantity of output results may be determined based on a preset quantity of GOP lengths, and a GOP length indicated by an output result is obtained based on the mapping relationship between the output results and the GOP lengths. For example, the first target model is a three-category model, at this time, the output results may be specific values of 0, 1, and 2. Accordingly, the values indicate different GOP lengths, for example, the value of 0 indicates that the GOP length is 4, the value of 1 indicates that the GOP length is 8, and the value of 2 indicates that the GOP length is 16. In this way, the GOP length is obtained based on the output result.

Furthermore, it can be understood that, in practical application, the output result of the first target model may also be a value directly indicating a GOP length. For example, the three-category model is still taken as an example, at this time, the output results may also be 4, 8, 16, and the like, and the values accordingly indicate different GOP lengths, the value of 4 indicates that the GOP length is 4, the value of 8 indicates that the GOP length is 8, and the value of 16 indicates that the GOP length is 16.

It should be noted that the forgoing is only an illustrative description, and output results with other forms may also be used in practical application, which are not limited by the solution of the present disclosure.

Figure 2A:
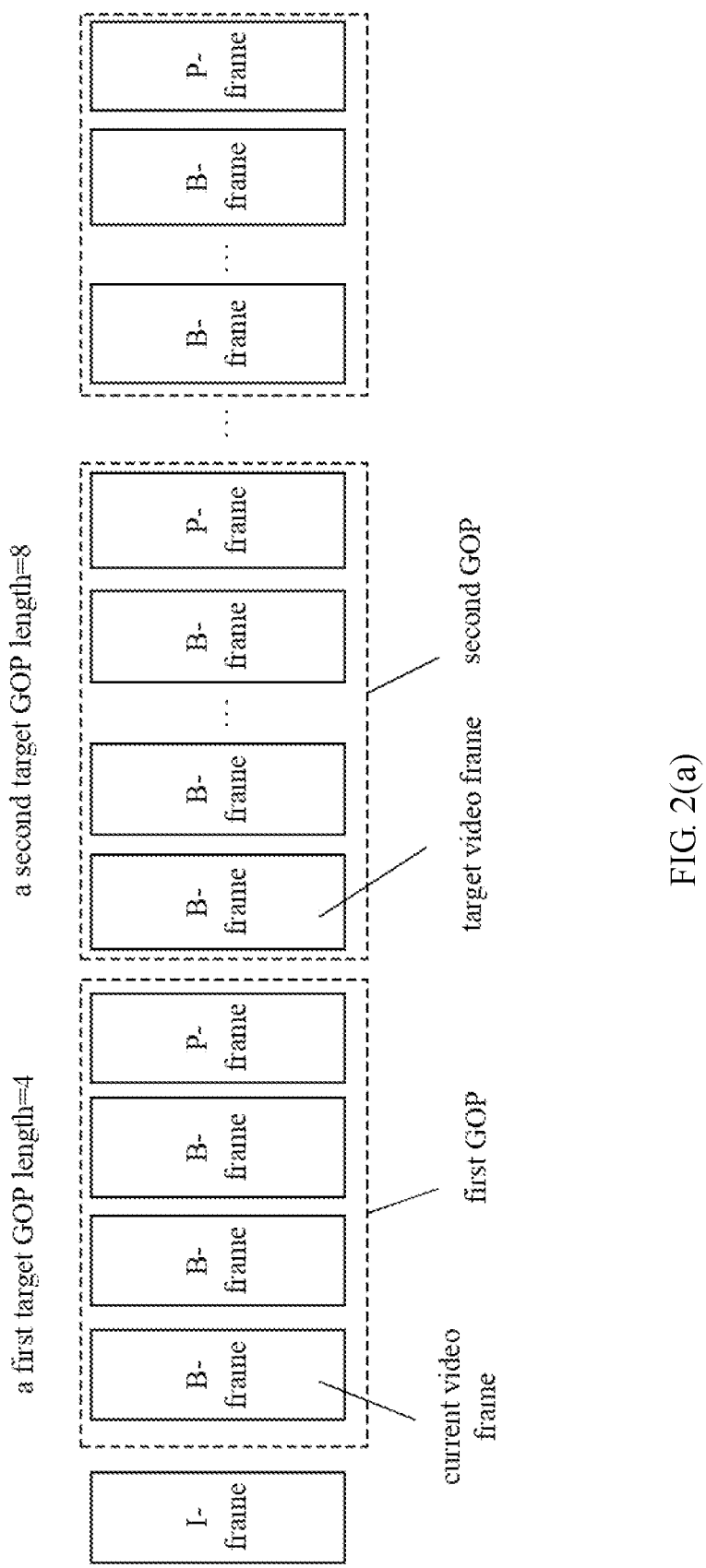
FIGS. 2(a) and 2(b) are schematic diagrams of a video frame sequence to be encoded of a video frame processing method in a specific example according to the embodiments of the present disclosure.

In a specific example of the solution of the present disclosure, the current video frame is a B-frame in the video frame sequence to be encoded. Herein, the B-frame is an intermediate frame in the video frame sequence to be encoded, i.e., a bidirectional difference frame able to refer frames that appear before and after it. As such, compatibility for an existing efficient video encoding technology lays a foundation for engineering promotion. For example, as shown in FIG. 2(a), it is a schematic diagram of the video frame sequence to be encoded. When it is determined that the first target GOP length of the current video frame (that is, the B-frame referred to in FIG. 2 (a)) is 4, a GOP having the first target GOP length may be obtained. Thus, it lays a foundation for subsequent compression processing and encoding processing.

Figure 2B:
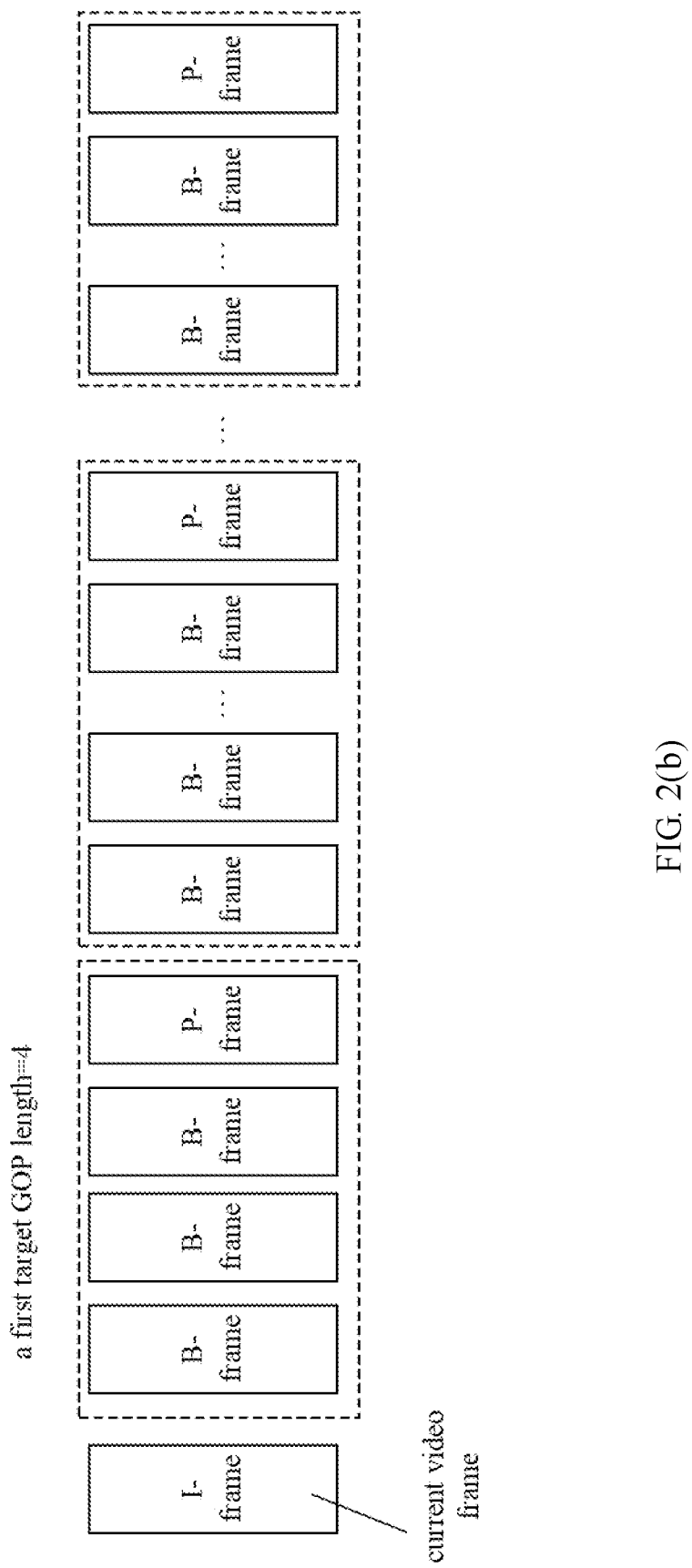

In practical application, there may also be a case of that a current encoding frame is the I-frame in the video frame sequence to be encoded. At this time, as shown in FIG. 2(b), if the current encoding frame is the I-frame and it is determined that the first target GOP length of the current video frame is 4, a GOP having 4 frames may be formed from a next frame of the current encoding frame. Furthermore, in order to improve accuracy of the predicted GOP length, when the current encoding frame is the I-frame, it may be directly skipped without predicting, and the next frame of the I-frame is directly taken as the current encoding frame which will be processed based ono the solution of the present disclosure.

Furthermore, the video frame sequence to be encoded is a sub-sequence selected from video data to be encoded. As shown in FIG. 2(a), in the video frame sequence to be encoded, the first frame is an I-frame, the intermediate frame is a B-frame, and the last frame is a P-frame. As such, the compatibility for the existing efficient video encoding technology lays the foundation for engineering promotion, and a problem of reduced encoding quality due to an existing fixed GOP length in the existing efficient video encoding technology is solved.

It should be noted that the solution of the present disclosure is applied to an open GOP scenario. At this time, only the first frame in the video frame sequence to be encoded is the I-frame. In other words, the GOP obtained based on the GOP length in the solution of the present disclosure includes a plurality of B-frames and one P-frame. Accordingly, determining of the GOP length may also be interpreted as determining the quantity of B-frames in the GOP. Furthermore, after the quantity of B-frames is determined, the GOP length is a sum of the quantity of B-frames and 1.

Furthermore, the first output result outputted by the first target model may also indicate the quantity of B-frames corresponding to the current video frame, at this time, the obtained first target GOP length is equal to the sum of the quantity of B-frames and 1.

In a specific example of the solution of the present disclosure, the first target model is obtained by performing model training on a first preset model based on a preset characteristic of a video frame sample in a target video frame sequence sample and label data of the video frame sample. The label data of the video frame sample is determined based on a GOP length sample corresponding to the video frame sample. As such, the first target model is able to predict the GOP length corresponding to the current video frame, thus, on the basis of improving the encoding performance, the compatibility and applicability are stronger, and processing efficiency is also improved.

In a specific example of the solution of the present disclosure, the GOP length sample corresponding to the video frame sample is a preset GOP length corresponding to target encoding characteristic information selected from at least two first preset GOP lengths. The target encoding characteristic information is selected from at least two pieces of first encoding characteristic information which are obtained after encoding the target video frame sequence sample based on the at least two first preset GOP lengths with starting from the video frame sample. As such, a simple and feasible label data production method is provided, which lays a foundation for improving accuracy of the model and the encoding performance.

It may be understood that a training method of the first target model may be seen in following examples, which will not be repeatedly described here.

Figure 3:
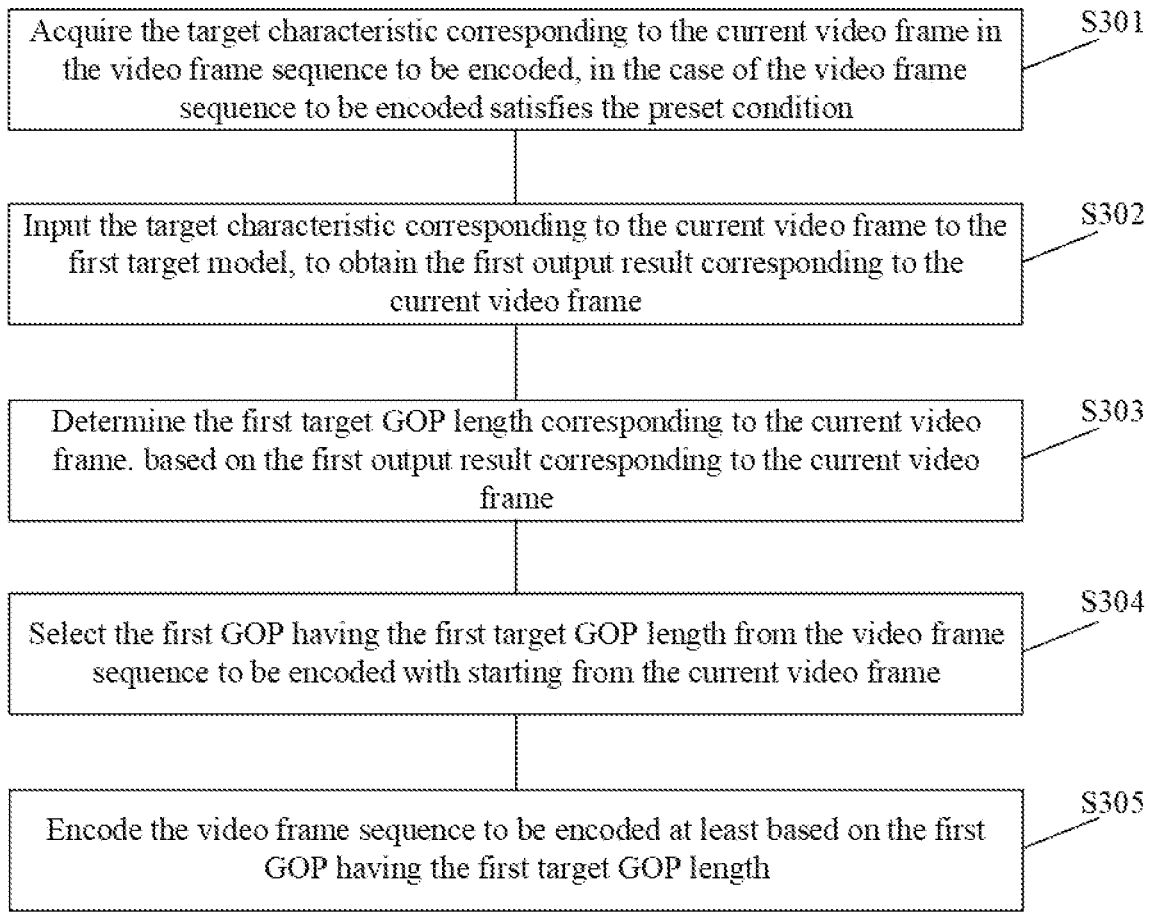
FIG. 3 is a second schematic diagram of an implementation flow of a video frame processing method according to the embodiments of the present disclosure.

In a specific example of the solution of the present disclosure, the video frame processing method is provided. Specifically, FIG. 3 is a second schematic diagram of an implementation flow of the video frame processing method according to the embodiments of the present disclosure. The method may be alternatively applied to electronic devices, such as a personal computer, a server, a server cluster, or the like, which is not specifically limited by the solution of the present disclosure. The method includes at least part of the following contents. It may be understood that the relevant contents of the method shown in FIGS. 1 and 2(a) are also applicable to the method shown in FIG. 3. On this basis, the relevant contents shown in FIG. 3 may be seen in the above specific examples, and will not be repeatedly described here.

Furthermore, as shown in FIGS. 2(a) and 3, specific steps include the followings.

In step S301, the target characteristic corresponding to the current video frame in the video frame sequence to be encoded is acquired, in the case of the video frame sequence to be encoded satisfies the preset condition.

In step S302, the target characteristic corresponding to the current video frame is inputted to the first target model, to obtain the first output result corresponding to the current video frame.

In step S303, the first target GOP length corresponding to the current video frame is determined based on the first output result corresponding to the current video frame.

In step S304, the first GOP having the first target GOP length is selected from the video frame sequence to be encoded with starting from the current video frame.

In step S305, the video frame sequence to be encoded is encoded at least based on the first GOP having the first target GOP length.

Herein, the first GOP in the video frame sequence to be encoded may be encoded after obtaining the first GOP.

As such, the solution of the present disclosure predicts the first GOP length corresponding to the current video frame by using the pre-trained first target model, thereby solving the problem of reduced encoding quality due to the existing fixed GOP length, and realizing the adaptive adjustment of the GOP length during encoding. In particular, with respect to the sequence relevant to large scenario fluctuations, the solution of the present disclosure enables the better encoding performance.

In a specific example of the solution of the present disclosure, the remaining video frame sequence to be encoded may be processed based on the method shown in FIG. 1 or 3, after determining the first target GOP length corresponding to the current video frame, and such process is repeated until the processing for the video frame sequence to be encoded is completed. The processing includes the followings.

A target characteristic corresponding to a target video frame in the remaining video frame sequence to be encoded is acquired, in the case of the remaining video frame sequence to be encoded satisfies the preset condition. The remaining video frame sequence to be encoded is the video frame sequence to be encoded excluding the first GOP. Herein, the target video frame may be the first frame in the remaining video frame sequence to be encoded.

The target characteristic corresponding to the target video frame is inputted to the first target model, to obtain a second output result corresponding to the target video frame.

A second target GOP length corresponding to the target video frame is determined based on the second output result corresponding to the target video frame.

Herein, the target video frame may be interpreted as a re-determined new current video frame. On this basis, the above method applied to the current video frame may be applied to the target video frame.

In a specific example, the target video frame is a B-frame in the remaining video frame sequence to be encoded. As such, the compatibility for the existing efficient video encoding technology lays the foundation for engineering promotion. For example, as shown in FIG. 2(a), it is the schematic diagram of the video frame sequence to be encoded. In the case of the second target GOP length of the target video frame (that is, the B-frame referred to in FIG. 2(a)) is 8, a GOP having the second target GOP length may be obtained. Thus, it lays a foundation for subsequent compression processing and encoding processing.

Furthermore, in another specific example, as shown in FIG. 2(a), a second GOP having the second target GOP length may also be selected from the remaining video frame sequence to be encoded with starting from the target video frame, after obtaining the second target GOP length. For example, in the case of that the second target GOP length is 8, the second GOP having the second target GOP length may be obtained, and the video frame sequence to be encoded is encoded at least based on the second GOP having the second target GOP length.

Herein, the second GOP in the video frame sequence to be encoded may be encoded after obtaining the second GOP, and such process is repeated until the encoding of the video frame sequence to be encoded is completed.

As such, the solution of the present disclosure predicts the second target GOP length corresponding to the target video frame by using the pre-trained first target model, thereby solving the problem of reduced encoding quality due to the existing fixed GOP length, and realizing the adaptive adjustment of the GOP length. In particular, with respect to the sequence relevant to large scene fluctuations, the solution of the present disclosure enables the better encoding performance.

In a specific example of the solution of the present disclosure, a following manner may be used to determine whether the video frame sequence to be encoded satisfies the preset condition or not. Specifically, it is determined that the video frame sequence to be encoded satisfies the preset condition in the case of a quantity of video frames included in the video frame sequence to be encoded is greater than a preset threshold. As such, a predicting timing is provided, that is, the first target model needs to be called only in the case of that the quantity of video frames included in the video frame sequence to be encoded is greater than the preset threshold, thereby laying a foundation for further improving encoding efficiency, and such manner is simple, feasible and convenient for engineering promotion.

Alternatively, in the case of the quantity of video frames included in the video frame sequence to be encoded is less than or equal to the preset threshold, a second preset GOP length is taken as the GOP length of the current video frame in the video frame sequence to be encoded.

That is, in the example, the first target model is called and the GOP length corresponding to the current video frame is predicted based on the first target model only in the case of that the quantity of video frames included in the video frame sequence to be encoded is greater than the preset threshold. In the case of that the quantity of video frames included in the video frame sequence to be encoded is less than or equal to the preset threshold, a preset fixed GOP length, that is, the second preset GOP length, is used. Thus, the problem of reduced encoding quality due to the existing fixed GOP length is solved on the basis of non-losing the encoding efficiency. On the other words, the solution of the present disclosure can give consideration to the encoding efficiency on the basis of improving the encoding quality, meanwhile, the method is simple, feasible and convenient for engineering promotion.

Herein, the preset threshold may be set based on an actual need, which is not limited by the solution of the present disclosure.

As such, the solution of the present disclosure predicts the first target GOP length corresponding to the current video frame by using the pre-trained first target model, thereby solving the problem of reduced encoding quality due to the existing fixed GOP length, and achieving the adaptive adjustment of the GOP length. In particular, with respect to the sequence relevant to large scene fluctuations, the solution of the present disclosure enables the better encoding performance.

Figure 4:
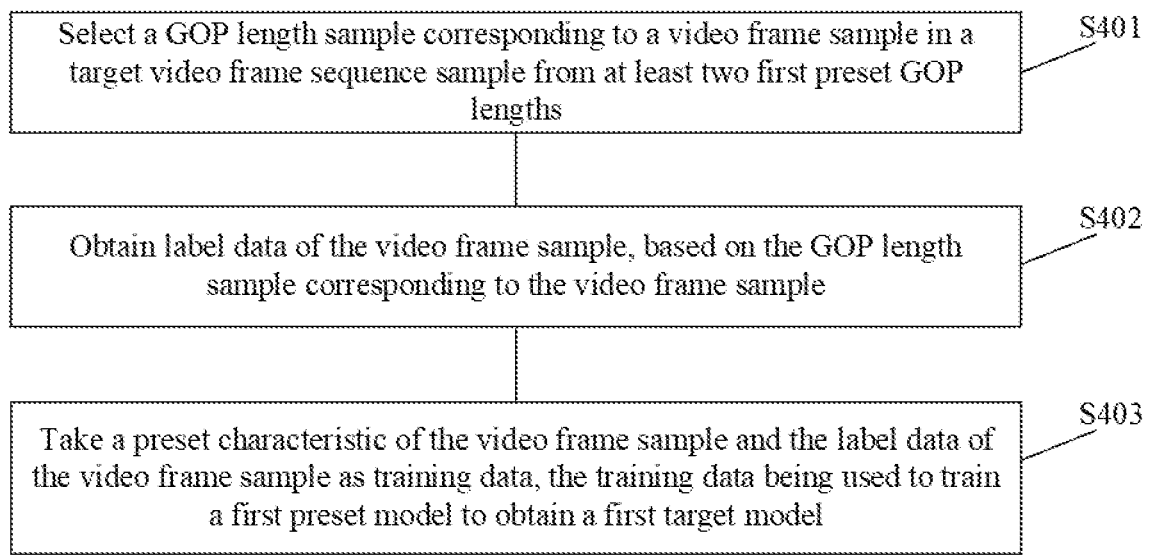
FIG. 4 is a schematic diagram of an implementation flow of a model training method according to the embodiments of the present disclosure.

The solution of the present disclosure also provides a model training method, which is shown in FIG. 4 and includes the followings.

In step S401, the GOP length sample corresponding to the video frame sample in the target video frame sequence sample is selected from the at least two first preset GOP lengths.

In step S402, the label data of the video frame sample is obtained based on the GOP length sample corresponding to the video frame sample.

For example, in the case of the GOP length sample corresponding to the video frame sample is 4, the label data of the video frame sample may be set as 0; in the case of the GOP length sample corresponding to the video frame sample is 8, the label data of the video frame sample may be set as 1; and in the case of the GOP length sample corresponding to the video frame sample is 16, the label data of the video frame sample may be set as 2. Thus, the first target model obtained by being trained in such manner may be the three-category model.

Alternatively, the GOP length sample corresponding to the video frame sample may be directly taken as the label data of the video frame sample. For example, the three-category model is still taken as an example, in the case of that the GOP length sample corresponding to the video frame sample is 4, the label data of the video frame sample may be set as 4; in the case of the GOP length sample corresponding to the video frame sample is 8, the label data of the video frame sample may be set as 8; and in the case of the GOP length sample corresponding to the video frame sample is 16, the label data of the video frame sample may be set as 16. Thus, the first target model is also obtained by training.

It may be understood that, the forgoing is only an illustrative description, and in practical application, other label setting manner may also be selected. Furthermore, the obtained first target model may also be a two-category model, a four-category model, or the like, which is not limited by the solution of the present disclosure.

In step S403, a preset characteristic of the video frame sample and the label data of the video frame sample are taken as training data. The training data is used to train the first preset model to obtain the first target model.

As such, the solution of the present disclosure provides a model for efficiently predicting the GOP length corresponding to the current video frame, thereby laying a foundation for solving the problem of reduced encoding quality due to the existing fixed GOP length, and providing a model support for realizing the adaptive adjustment of the GOP length.

In a specific example, the preset characteristic of the video frame sample includes at least one of an intra cost of the current video frame sample, a quantity of intra blocks of the current video frame sample, an intra cost of another video frame sample associated with the current video frame sample, or a quantity of intra blocks of the other video frame sample associated with the current video frame sample.

Herein, the other video frame sample associated with the current video frame sample may be determined based on the first preset GOP lengths. Taking three first preset GOP lengths including 4, 8, 16 as an example, the other video frame sample associated with the current video frame sample may include a fourth frame, an eighth frame, a sixteenth frame starting from the current video frame.

The forgoing is only an illustrative description. In practical application, other preset characteristics may also be selected to improve accuracy of a model result, which is not limited by the solution of the present disclosure.

In a specific example of the solution of the present disclosure, the preset characteristic is selected from a plurality of characteristics of the video frame sample based on a preset rule and includes at least one of: an original characteristic of the video frame sample or a combination characteristic obtained based on at least two original characteristics.

For example, the original characteristic includes at least one of: the intra cost of the current video frame sample, the quantity of intra blocks of the current video frame sample, the intra cost of the other video frame sample associated with the current video frame sample, or the quantity of intra blocks of the other video frame sample associated with the current video frame sample. Accordingly, the combination characteristic may be a new characteristic obtained based on at least two of the original characteristic. For example, the new characteristic is obtained by processing two or more original characteristics through a calculating or splicing manner. In practical application, with respect to the original characteristic having a physical meaning, the obtained new characteristic that is the combination characteristic may not have a specific physical meaning. For example, the combination characteristic is equal to a product of the intra cost of the current video frame sample and the quantity of intra blocks of the current video frame sample, and at this time, such combination characteristic does not have a physical meaning. However, a specific value of the combination characteristic associates with the output result, and the accuracy of the model can also be improved by taking the combination characteristic as train data.

It may be understood that a characteristic attribute (or characteristic type) of the target characteristic input during a model predicting phase associates with a characteristic attribute (or characteristic type) of the preset characteristic used during a model training phase. For example, the characteristic attribute of the target characteristic is totally same as the characteristic attribute of the preset characteristic, or is at least part in the characteristic attribute of the preset characteristic, which is not limited by the solution of the present disclosure, as long as predicting based on the first target model can be achieved. For example, the preset characteristic may be the intra cost of the current video frame sample, the quantity of intra blocks of the current video frame sample, the intra cost of the other video frame sample associated with the current video frame sample, and the quantity of intra blocks of the other video frame sample associated with the current video frame sample; and at this time, the target characteristic may only be the intra cost of the current video frame sample, or may be the intra cost and quantity of intra blocks of the current video frame sample, or may be the intra cost and quantity of intra blocks of the current video frame sample and the intra cost and quantity of intra blocks of the other video frame sample associated with the current video frame sample, which is not limited by the solution of the present disclosure.

As such, scientific characteristics are used for model training, which improves prediction accuracy of the first target model, lays a foundation for subsequent improvement of the prediction accuracy, and also lays a foundation for solving the problem of reduced encoding quality due to the existing fixed GOP length and realizing the adaptive adjustment of the GOP length.

In a specific example of the solution of the present disclosure, the preset characteristic is obtained by sifting from the plurality of characteristics based on a characteristic value of the plurality of characteristics, and the characteristic value of the plurality of characteristics is obtained by inputting the plurality of characteristics to a second target model.

That is, during the training of the first preset model, the used preset characteristic is obtained by sifting characteristics. For example, the preset characteristic is obtained by sifting the plurality of characteristics using the second target model, so that scientific characteristics are used for model training, which further improve the prediction accuracy of the first target model.

It may be understood that, the plurality of characteristics includes at least one of the original characteristic of the video frame sample, or the combination characteristic obtained based on at least two original characteristics; and thus it is convenient to select the preset characteristic from the plurality of characteristics.

For example, an xgBoost model is taken as a model to be trained, and a plurality of characteristics to be processed and labels indicating importance of the characteristics to be processed are selected to train the model to be trained, to obtain the second target model. After obtaining the second target model, the plurality of characteristics is input to the second target model to obtain characteristic values of the plurality of characteristics. Herein, a characteristic value can represent importance of a characteristic corresponding to the characteristic value. Then the importance of the plurality of characteristics is sorted based on the characteristic values, and the preset characteristic is obtained based on a sorted result. For example, descending sorting is made based on the characteristic values, and first N characteristics are regarded as the preset characteristic.

In a specific example of the solution of the present disclosure, the GOP length sample corresponding to the video frame sample in the target video frame sequence sample may be determined by using the following manner which includes the followings.

The target video frame sequence sample is encoded with starting from the video frame sample based on the at least two preset GOP lengths, to obtain at least two pieces of first encoding characteristic information. For example, in the case of the first preset GOP length is 4, the target video frame sequence sample is encoded with starting from the video frame sample based on the first preset GOP length of 4, to obtain one piece of first encoding characteristic information. Furthermore, in the case of the first preset GOP length is 8, the target video frame sequence sample is encoded with starting from the video frame sample based on the first preset GOP length of 8, to further obtain one piece of first encoding characteristic information. Thus, a plurality of pieces of first encoding characteristic information corresponding to the first preset GOP lengths is obtained.

Furthermore, target encoding characteristic information is selected from the at least two pieces of first encoding characteristic information. For example, optimal encoding characteristic information is selected and used as the target encoding characteristic information.

On this basis, in the above step S401, selecting the GOP length sample corresponding to the video frame sample in the target video frame sequence sample from the at least two first preset GOP lengths includes: selecting the preset GOP length corresponding to the target encoding characteristic information from the at least two first preset GOP lengths as the GOP length sample corresponding to the video frame sample.

As such, the GOP length sample corresponding to the video frame sample is selected based on the encoding characteristic information, thereby laying a foundation for improving the prediction accuracy of the first target model. Meanwhile, such manner is simple and easy to explain, which lays a foundation for subsequent engineering promotion.

In a specific example of the solution of the present disclosure, in order to further improve the prediction accuracy, the following operations may also be conducted.

During encoding processing, influence of the B-frame and/or the P-frame in the target video frame sequence sample on the I-frame in the target video frame sequence sample is eliminated. As shown in FIG. 2(a), in the target video frame sequence sample, the first frame is the I-frame, the intermediate frames are the B-frame, and the last frame is the P-frame.

On this basis, encoding the target video frame sequence sample with starting from the video frame sample based on the at least two preset GOP lengths, to obtain the at least two pieces of first encoding characteristic information includes: encoding the target video frame sequence sample with starting from the video frame sample based on the at least two preset GOP lengths, after eliminating the influence on the I-frame in the target video frame sequence sample, to obtain the at least two pieces of first encoding characteristic information.

Herein, considering that in practical application, the selected target video frame sequence sample is extracted from a target video data sample, compared with the target video data sample, the target video frame sequence sample is shorter. Therefore, during model training, it is necessary to eliminate the influence of the I-frame on an encoding result, since that, compared with coding results (such as code rates) of the B-frame and the P-frame, a code rate of I-frame is larger, and subsequent frames in the target video frame sequence sample also refer to the I-frame for encoding. Therefore, in order to avoid a greater influence of the I-frame on the coding result, the I-frame needs to be relatively fixed, and at the same time, the relatively fixed I-frame will not be affected by changing of the GOP length, so as to improve accuracy of a prediction result.

As such, a foundation for effectively improving the accuracy of the prediction result is laid, which further lays a foundation for solving the problem of reduced encoding quality due to the existing fixed GOP length and realizing the adaptive adjustment of the GOP length, and such manner is simple and easy to explain, which lays a foundation for subsequent engineering promotion.

In a specific example of the solution of the present disclosure, the following manner is used to eliminate the influence on the I-frame. Specifically, eliminating the influence of the B-frame and/or the P-frame in the target video frame sequence sample on the I-frame in the target video frame sequence sample during the encoding processing described above includes: during the encoding processing, adjusting a relevant parameter of the B-frame and/or the P-frame affecting the encoding result of the I-frame in the target video frame sequence sample to a preset value. In this way, a simple and feasible manner is provided to efficiently eliminate the influence of the subsequent frames on the I-frame, which lays a foundation for efficiently improving the accuracy of the prediction result, solving the problem of reduced encoding quality due to the existing fixed GOP length and realizing the adaptive adjustment of the GOP length.

In a specific example of the solution of the present disclosure, the first encoding characteristic information is obtained based on relevant information of the B-frame and/or the P-frame in the target video frame sequence sample.

For example, the first encoding characteristic information includes at least one of: the code rate, peak signal to noise ratio (PSNR), structural similarity (SSIM), or video multimethod assessment fusion (VMAF) of the B-frame in the target video frame sequence sample; or the code rate, PSNR, SSIM, VMAF of the P-frame in the target video frame sequence sample.

In other words, the first encoding characteristic information does not include relevant information of the I-frame, so as to eliminate the influence of the I-frame, and further improve the accuracy of the prediction result, which lays a foundation for solving the problem of reduced encoding quality due to the existing fixed GOP length and realizing the adaptive adjustment of the GOP length.

As such, compared with an existing manner, the encoding performance of the solution of the present disclosure is better, and especially after scenario volatility has changed significantly, performance advantage is more prominent and the compatibility is stronger. Meanwhile, during processing, the solution of the present disclosure adopts a method of characteristic engineering, combines key characteristics required to determine the GOP length, and uses a machine learning model to sort the importance of the characteristics, so as to scientifically select the characteristics, so that the characteristics and the results have greater relevance.

In addition, during production of the labels, the solution of the present disclosure focuses on the current video frame, and adopts a simplified method to obtain an optimal GOP length. Moreover, this method requires less calculation, which improves production efficiency of the labels, thereby improving model training efficiency, and laying a foundation for reducing model training costs.

Figure 5:
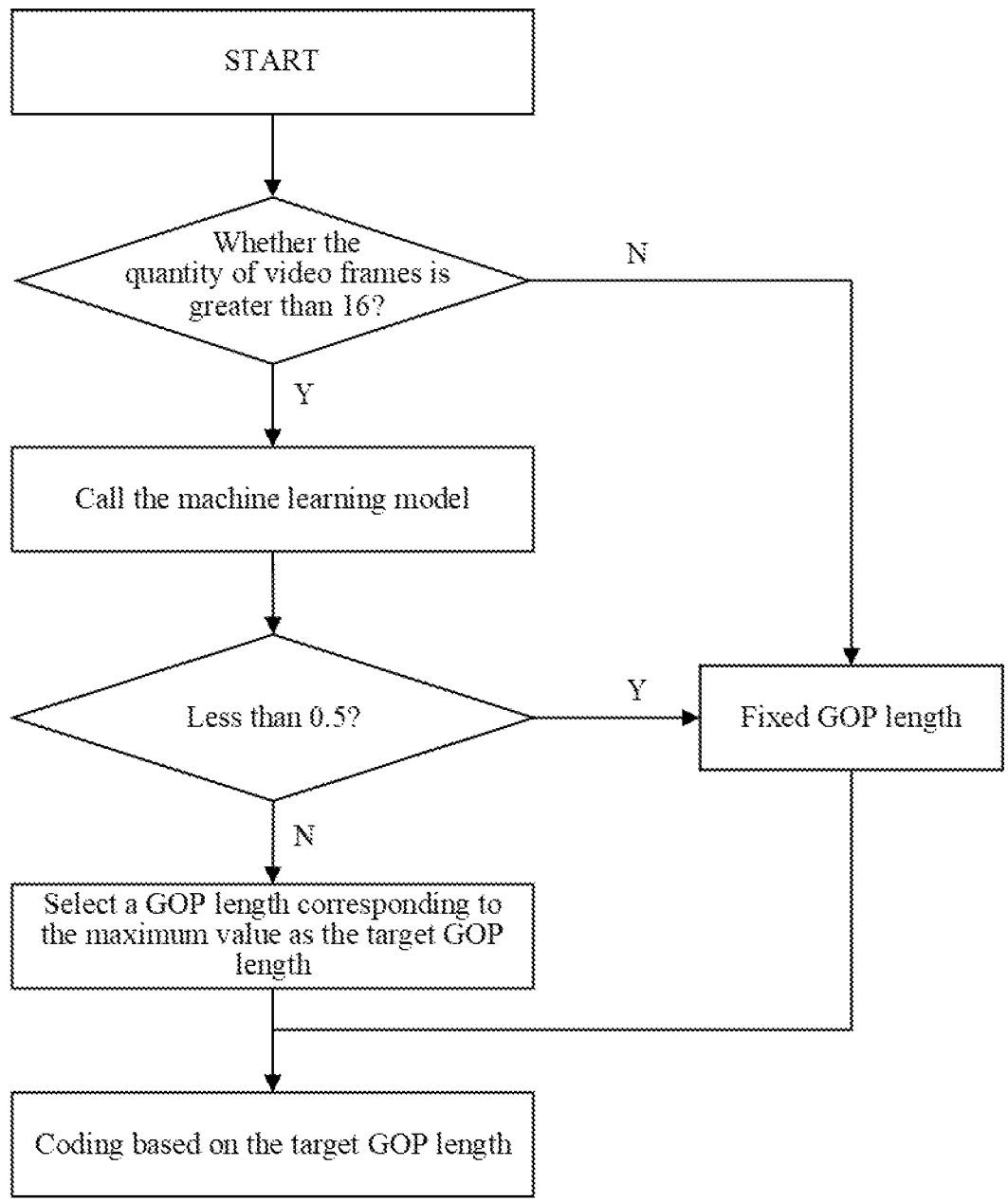
FIG. 5 is a schematic diagram of an implementation flow of a video frame processing method in a specific example according to the embodiments of the present disclosure.

The solution of the present disclosure is further descripted in detail in combination to a specific example. As shown in FIG. 5, main steps include the followings.

In step 1, the video frame sequence to be encoded is selected. For example, based on different time domain complexities and space domain complexities, the video frame sequence to be encoded is selected and obtained. It is determined whether the quantity of video frames included in the video frame sequence to be encoded is greater the preset value, such as 16; the step 2 is performed if the quantity is greater than the preset value such as 16; and the step 5 is performed if the quantity is not greater than the preset value.

In step 2, the machine learning model, that is the first target model, is called, and the target characteristic corresponding to the current video frame in the video frame sequence to be encoded is input to the called machine learning model, to obtain the output result.

This example takes the machine learning model being the three-category model as an example, and the output result is three probability values, each of which corresponds to a specific GOP length, such as 4, 8 or 16. Furthermore, the GOP length indicated by the maximum value among the probability values may be taken as the target GOP length.

Herein, with respect to the three-category model, and in the case of the GOP lengths indicated by the output three probability values are 4, 8 and 16, the target characteristic corresponding to the current video frame may specifically include: the intra cost of the current video frame, the quantity of intra blocks of the current video frame sample, the intra cost of the other video frame sample (such as the fourth frame, the eighth frame, or the sixteenth frame) associated with the current video frame sample, and/or the quantity of intra blocks of the other video frame sample (such as the fourth frame, the eighth frame, or the sixteenth frame) associated with the current video frame sample.

In step 3, it is determined whether the output result is less than a specific value, such as 0.5; the step 5 is performed, if it is less than the specific value; and step 4 of determining the target GOP length corresponding to the current video frame based on the output result is performed, if it is not less than the specific value.

Herein, it may be understood that the specific value may be determined based on an actual need, which is not limited by the solution of the present disclosure.

In step 4, a GOP length corresponding to the maximum value is selected as the target GOP length corresponding to the current video frame based on the output result, and the step 6 is performed.

In step 5, the preset fixed GOP length, that is the second preset GOP length, is taken as the target GOP length corresponding to the current video frame, and the step 6 is performed.

In step 6, the video frame sequence to be encoded is encoded based on the target GOP length.

Figure 6:
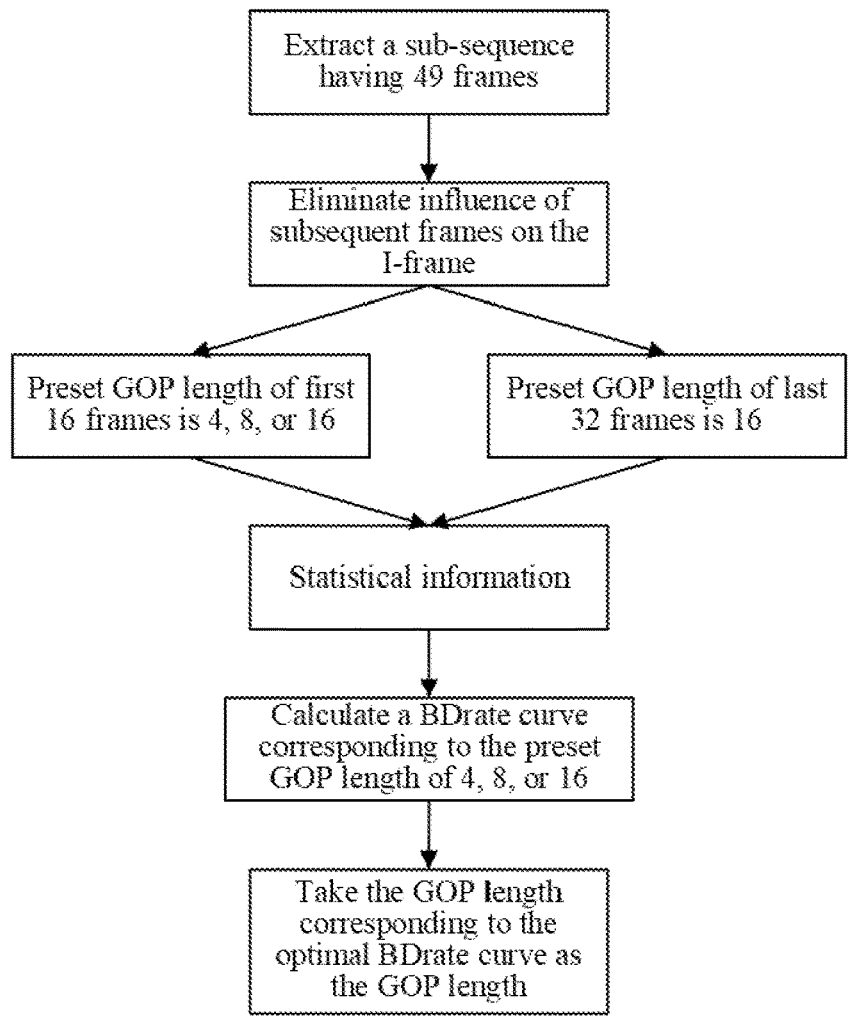
FIG. 6 is a schematic diagram of an implementation flow of determining a group of pictures (GOP) length sample of a video frame processing method in a specific example according to the embodiments of the present disclosure.

Furthermore, training steps of the first target model is described in detail hereinafter. Specifically, as shown in FIG. 6, the specific steps include the followings.

In step 1, 49 frames are extracted from the video data as the sub-sequence, that is the video frame sequence sample, and the first frame among the 49 frames is the I-frame.

Herein, the quantity of frames in the extracted sub-sequence should be large enough, such as, closer to the original video, to avoid a problem of inaccurate selection of the GOP length, since subsequent frames out of the sub-sequence may have an influence on a quantization parameter of the current frame during encoding. At this time, a small quantity of frames in the sub-sequence cannot contain the influence of the subsequent frames out of the sub-sequence on the current frame, and thus prediction accuracy is reduced. However, a too large quantity of frames in the sub-sequence may slow down calculation. On this basis, the sub-sequence selected in the example includes 49 frames after considering advantages and disadvantages.

In step 2, the influence of other frames in the sub-sequence on the I-frame is eliminated.

In step 3, the sub-sequence is divided into two parts, a first part includes first 16 frames, a second part includes last 32 frames, the first part is encoded based on the preset GOP length, that is the first preset GOP length, of 4, 8, or 16, and the second part is encoded based on the preset GOP length of 16, to product the labels.

In step 4, statistical information corresponding to the current frame when the preset GOP length is 4, 8, or 16 is obtained.

Herein, taking the preset GOP length of the first part is 4 and the preset GOP length of the second part is 16 as an example, the encoding result corresponding to the current frame is obtained after eliminating the influence of the other frames in the sub-sequence on the I-frame. The encoding results are counted and the statistical information, for example, including the code rate, PSNR, SSIM, VMAF, is obtained. Herein, the statistical information is the relevant information of the B-frame and the P-frame in the sub-sequence from the current frame, and does not include the relevant information of the I frame, since, as shown in FIG. 2 (*a*), the solution of the present disclosure focuses at the open GOP, and the GOP length is independent of the I-frame, so that the obtained statistical information does not include the relevant information of the I-frame.

In step 5, a BDrate curve of the current frame in the case of that the preset GOP length is 4, 8, or 16 is obtained based on the statistical information.

The BDrate curve of the current frame in the case of that the preset GOP length is 4, the BDrate curve of the current frame in the case of that the preset GOP length is 8, and the BDrate curve of the current frame in the case of that the preset GOP length is 16 are also obtained.

In step 6, an optimal BDrate curve of the current frame is obtained, and the GOP length corresponding to the optimal BDrate curve is selected as the optimal GOP length corresponding to the current frame, that is the GOP length sample.

Furthermore, the model is trained by making the label data based on the above manner. For example, with respect to the three-category model, in the case of that the current frame corresponds to the GOP length of 4, the label data of the current frame is set as 0; in the case of that the current frame corresponds to the GOP length of 8, the label data of the current frame is set as 1; and in the case of that the current frame corresponds to the GOP length of 16, the label data of the current frame is set as 2. Furthermore, the intra cost and quantity of intra blocks of the current frame and the intra costs and quantities of intra blocks of the fourth frame, the eighth frame, and the sixteenth frame from the current frame are taken as the preset characteristic, which is input to the first preset model together with the label data of the current frame for training, to obtain the first target model.

It should be noted that characteristic selection is required before model training, and the accuracy of the characteristic selection directly determines the accuracy of the output result. Based on this, in this example, the machine learning model, such as the xgBoost model, may be used to select characteristics, such as, the plurality of characteristics to be processed, and mark the plurality of characteristics to be processed based on their importance. As such, the xgBoost model is trained to obtain the second target model. At this time, the second target model may be used to predict the importance of the characteristics. For example, the characteristics is sorted based on the importance by using the trained second target model, and then the preset characteristic for training an initial model is selected, so as to improve the accuracy of the model.

Furthermore, when selecting characteristics, not only the original characteristic of the video frame sequence sample may be selected, but also the original characteristic may be combined to obtain the combination characteristic. For example, two or more original characteristics may be processed to obtain the new characteristic (i.e., the combination characteristic) through calculation or splicing. In practical application, compared with the original characteristic with a physical meaning, the new characteristic (i.e. the combination characteristic) obtained may not have a clear physical meaning. However, there is an association between the specific value of the combination characteristic and the output result. At this time, using the combination characteristic as training data can also improve the accuracy of the model.

Based on this, the solution of the present disclosure selects a characteristic with higher correlation with the result, by using the machine learning model with a better performance and a more systematic characteristic selection method, and trains and obtains the model with a better performance based on the selected characteristics. Thus, the GOP length is predicted based on the trained model. In this way, the accuracy of the prediction result is effectively improved, and the encoding performance is effectively improved. In addition, this method uses less bandwidth.

Figure 7:
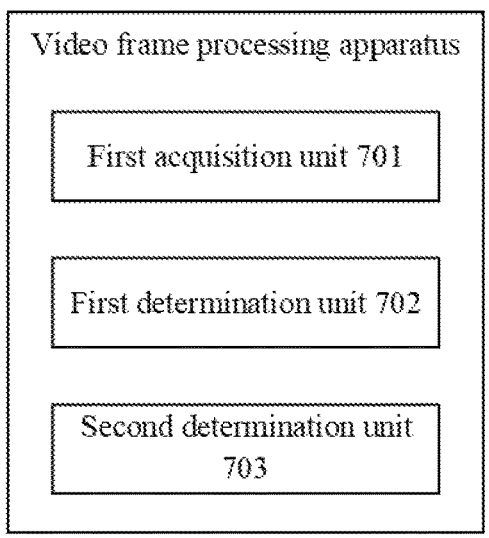
FIG. 7 is a first schematic diagram of a structure of a video frame processing apparatus according to the embodiments of the present disclosure.

The solution of the present disclosure also provides a video frame processing apparatus, which is shown in FIG. 7 and includes the followings.

A first acquisition unit 701 is configured to acquire a target characteristic corresponding to a current video frame in a video frame sequence to be encoded, in the case of the video frame sequence to be encoded satisfies a preset condition.

A first determination unit 702 is configured to input the target characteristic corresponding to the current video frame to a first target model, to obtain a first output result corresponding to the current video frame.

A second determination unit 703 is configured to determine a first target GOP length corresponding to the current video frame, based on the first output result corresponding to the current video frame.

In a specific example of the solution of the present disclosure, the first target mode is obtained by performing model training on a first preset model based on a preset characteristic of a video frame sample in a target video frame sequence sample and label data of the video frame sample.

The label data of the video frame sample is determined based on a GOP length sample corresponding to the video frame sample.

In a specific example of the solution of the present disclosure, the GOP length sample corresponding to the video frame sample is a preset GOP length corresponding to target encoding characteristic information selected from at least two first preset GOP lengths.

The target encoding characteristic information is selected from at least two pieces of first encoding characteristic information which are obtained after encoding the target video frame sequence sample based on the at least two first preset GOP lengths with starting from the video frame sample.

Figure 8:
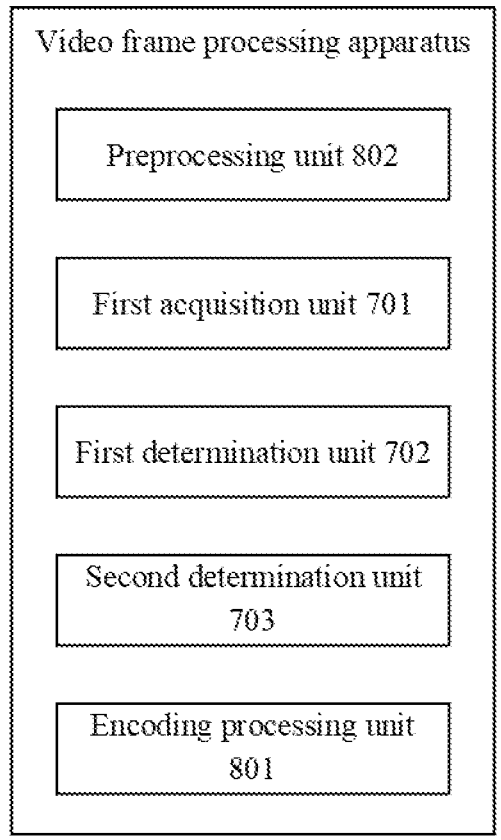
FIG. 8 is a second schematic diagram of a structure of a video frame processing apparatus according to the embodiments of the present disclosure.

In a specific example of the solution of the present disclosure, as shown in FIG. 8, an encoding processing unit 801 is further included.

The encoding processing unit 801 is configured to select a first GOP having the first target GOP length from the video frame sequence to be encoded with starting from the current video frame, and encode the video frame sequence to be encoded at least based on the first GOP having the first target GOP length.

In a specific example of the solution of the present disclosure, the first acquisition unit 701 is further configured to acquire a target characteristic corresponding to a target video frame in a remaining video frame sequence to be encoded, in the case of that the remaining video frame sequence to be encoded satisfies the preset condition, and the remaining video frame sequence to be encoded is the video frame sequence to be encoded excluding the first GOP.

The first determination unit 702 is further configured to input the target characteristic corresponding to the target video frame to the first target model, to obtain a second output result corresponding to the target video frame.

The second determination unit 703 is further configured to determine a second target GOP length corresponding to the target video frame, based on the second output result corresponding to the target video frame.

In a specific example of the solution of the present disclosure, as shown in FIG. 8, a preprocessing unit 802 is further included.

The preprocessing unit 802 is configured to determine that the video frame sequence to be encoded satisfies the preset condition, in the case of that a quantity of video frames included in the video frame sequence to be encoded is greater than a preset threshold.

In a specific example of the solution of the present disclosure, the second determination unit 703 is further configured to take a second preset GOP length as a GOP length of the current video frame in the video frame sequence to be encoded, in the case of that the quantity of video frames included in the video frame sequence to be encoded is less than or equal to the preset threshold.

In a specific example of the solution of the present disclosure, the current video frame is a B-frame in the video frame sequence to be encoded.

In a specific example of the solution of the present disclosure, the video frame sequence to be encoded is a sub-sequence selected from the video data to be encoded, and in the video frame sequence to be encoded, the first frame is an I-frame, the intermediate frame is the B-frame, and the last frame is a P-frame.

Descriptions of specific functions and examples of the units in the apparatus of the embodiments of the present disclosure may refer to relevant descriptions of corresponding steps in the above method embodiments, which will not be repeated herein.

Figure 9:
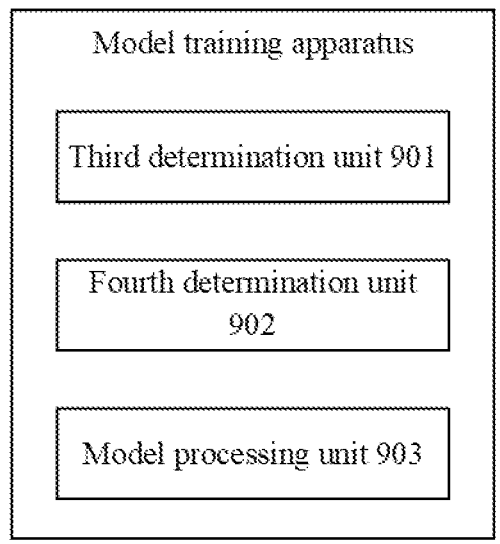
FIG. 9 is a schematic diagram of a structure of a model training apparatus according to the embodiments of the present disclosure.

The solution of the present disclosure further provides a model training apparatus, which is shown as FIG. 9 and includes the followings.

A third determination unit 901 is configured to select a GOP length sample corresponding to a video frame sample in a target video frame sequence sample from at least two first preset GOP lengths.

A fourth determination unit 902 is configured to obtain label data of the video frame sample, based on the GOP length sample corresponding to the video frame sample.

A model processing unit 903 is configured to take a preset characteristic of the video frame sample and the label data of the video frame sample as training data which is used to train a first preset model to obtain a first target model.

In a specific example of the solution of the present disclosure, the preset characteristic is selected from a plurality of characteristics of the video frame sample based on a preset rule and includes at least one of an original characteristic of the video frame sample or a combination characteristic obtained based on at least two original characteristics.

In a specific example of the solution of the present disclosure, the preset characteristic is obtained by sifting from the plurality of characteristics based on a characteristic value of the plurality of characteristics.

The characteristic value of the plurality of characteristics is obtained by inputting the plurality of characteristics to a second target model.

In a specific example of the solution of the present disclosure, the third determination unit 901 is further configured to: encode the target video frame sequence sample with starting from the video frame sample based on the at least two preset GOP lengths, to obtain at least two pieces of first encoding characteristic information; select target encoding characteristic information from the at least two pieces of first encoding characteristic information; and select a preset GOP length corresponding to the target encoding characteristic information from the at least two first preset GOP lengths as the GOP length sample corresponding to the video frame sample.

In a specific example of the solution of the present disclosure, the third determination unit 901 is further configured to: eliminate influence of a B-frame and/or a P-frame in the target video frame sequence sample on an I-frame in the target video frame sequence sample, during the encoding, where in the target video frame sequence sample, the first frame is the I-frame, the intermediate frame is the B-frame, and the last frame is the P-frame; and encode the target video frame sequence sample with starting from the video frame sample based on the at least two preset GOP lengths, after eliminating the influence on the I-frame in the target video frame sequence sample, to obtain the at least two pieces of first encoding characteristic information.

In a specific example of the solution of the present disclosure, the third determination unit 901 is specifically configured to, during the encoding, adjust a relevant parameter of the B-frame and/or the P-frame affecting an encoding result of the I-frame in the target video frame sequence sample to a preset value.

In a specific example of the solution of the present disclosure, the first encoding characteristic information is obtained based on relevant information of the B-frame and/or P-frame in the target video frame sequence sample.

Descriptions of specific functions and examples of the units in the apparatus of the embodiments of the present disclosure may refer to relevant descriptions of corresponding steps in the above method embodiments, which will not be repeated here.

In the technical solution of the present disclosure, the acquisition, storage and application of the user's personal information involved are all in compliance with the provisions of relevant laws and regulations, and do not violate public order and good customs.

According to the embodiments of the present disclosure, the present disclosure also provides an electronic device, a readable storage medium and a computer program product.

Figure 10:
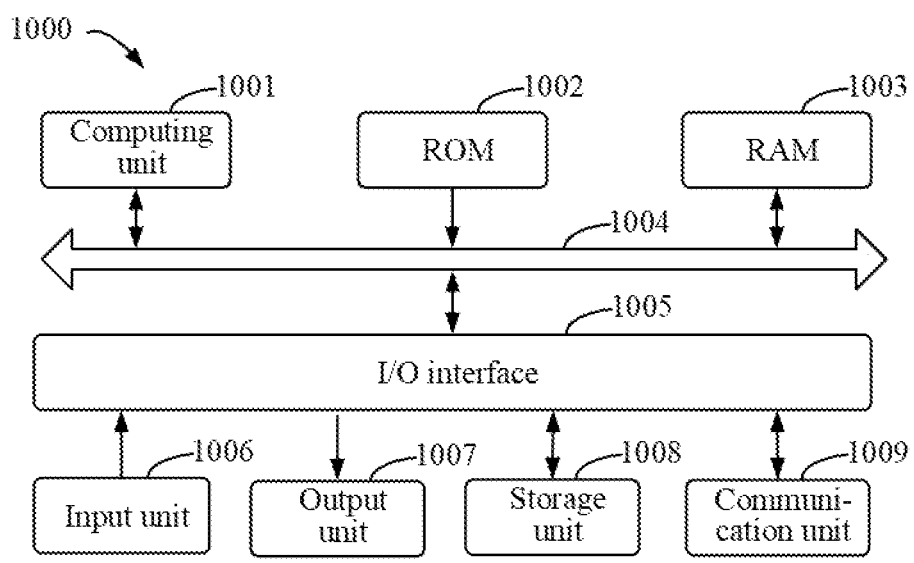
FIG. 10 is a block diagram of an electronic device for implementing a video frame processing method or a model training method according to the embodiments of the present disclosure.

FIG. 10 is a schematic block diagram of an exemplary electronic device 1000 which may implement the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital processing, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 10, the device 1000 includes a computing unit 1001 that may perform various appropriate actions and processes according to a computer program stored in a Read-Only Memory (ROM) 1002 or a computer program loaded from a storage unit 1008 into a Random-Access Memory (RAM) 1003. Various programs and data required for an operation of device 1000 may also be stored in the RAM 1003. A computing unit 1001, the ROM 1002 and the RAM 1003 are connected to each other through a bus 1004. An input/output (I/O) interface 1005 is also connected to the bus 1004.

A plurality of components in the device 1000 are connected to the I/O interface 1005, and include an input unit 1006 such as a keyboard, a mouse, or the like; an output unit 1007 such as various types of displays, speakers, or the like; the storage unit 1008 such as a magnetic disk, an optical disk, or the like; and a communication unit 1009 such as a network card, a modem, a wireless communication transceiver, or the like. The communication unit 1009 allows the device 1000 to exchange information/data with other devices through a computer network such as the Internet and/or various telecommunication networks.

The computing unit 1001 may be various general-purpose and/or special-purpose processing components with processing and computing capabilities. Some examples of the computing unit 1001 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 1001 performs various methods and processing described above, such as the above video frame processing method and the model training method. For example, in some implementations, the above adjustment method of the target object may be implemented as a computer software program tangibly contained in a computer-readable medium, such as the storage unit 1008. In some implementations, a part or all of the computer program may be loaded and/or installed on the device 1000 via the ROM 1002 and/or the communication unit 1009. When the computer program is loaded into RAM 1003 and executed by the computing unit 1001, one or more steps of the video frame processing method and the model training method described above may be performed. Alternatively, in other implementations, the computing unit 1001 may be configured to perform the above video frame processing method and the model training method by any other suitable means (e.g., by means of firmware).

Various implements of the system and technologies described above herein may be implemented in a digital electronic circuit system, an integrated circuit system, a Field Programmable Gate Array (FPGA), an Application Specific Integrated Circuit (ASIC), Application Specific Standard Parts (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random-Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a computing system including a front-end component (e.g., a user computer with a graphical user interface or web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and server are generally far away from each other and usually interact with each other through a communication network. A relationship between the client and the server is generated by computer programs running on corresponding computers and having a client-server relationship with each other. The server may be a cloud server, a distributed system server, or a block chain server.

It should be understood that, the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein.

The foregoing specific implementations do not constitute a limitation on the protection scope of the present disclosure. Those having ordinary skill in the art should understand that, various modifications, combinations, sub-combinations and substitutions may be made according to a design requirement and other factors. Any modification, equivalent replacement, improvement or the like made within the spirit and principle of the present disclosure shall be included in the protection scope of the present disclosure.

What is claimed is:

1. A method for processing a video frame, comprising:
    acquiring a target characteristic of the video frame in a video frame sequence to be encoded, in a case of a quantity of video frames included in the video frame sequence to be encoded is greater than a preset threshold; wherein a type set of the target characteristic is a sub-set of a type set of a preset characteristic of a video frame sample used for training a first preset model to obtain a first target model, and the type set of the preset characteristic comprises at least one of:
an intra cost of a given frame,
a quantity of intra blocks of the given frame,
an intra cost of another frame associated with the given frame, or
a quantity of intra blocks of the other frame associated with the given frame;
inputting the target characteristic to the first target model, to obtain a first output result corresponding to the video frame; wherein the first target model is configured to predict the first output result based on the target characteristic, and the first output result indicates a first target group of pictures (GOP) length corresponding to the video frame; and
determining the first target GOP length, based on the first output result, comprising:
determining the first target GOP length based on the first output result and a mapping relationship between an output result and a GOP length established in advance; or
obtaining the first target GOP length based on the first output result directly indicating the first target GOP.

2. The method of claim 1, wherein the first target model is obtained by performing model training on the first preset model based on the preset characteristic of the video frame sample in a target video frame sequence sample and label data of the video frame sample; and
the label data of the video frame sample is determined based on a GOP length sample corresponding to the video frame sample.

3. The method of claim 2, wherein the GOP length sample corresponding to the video frame sample is a preset GOP length corresponding to target encoding characteristic information selected from at least two first preset GOP lengths, and
the target encoding characteristic information is selected from at least two pieces of first encoding characteristic information; and the at least two pieces of first encoding characteristic information are obtained after encoding the target video frame sequence sample based on the at least two first preset GOP lengths with starting from the video frame sample.

4. The method of claim 1, further comprising:
selecting a first GOP having the first target GOP length from the video frame sequence to be encoded with starting from the video frame; and
encoding the video frame sequence to be encoded at least based on the first GOP having the first target GOP length.

5. The method of claim 1, further comprising:
taking a second preset GOP length as a GOP length of the video frame in the video frame sequence to be encoded, in a case of the quantity of video frames included in the video frame sequence to be encoded is less than or equal to the preset threshold.

6. The method of claim 1, wherein the video frame is a B-frame in the video frame sequence to be encoded.

7. The method of claim 6, wherein the video frame sequence to be encoded is a sub-sequence selected from video data to be encoded, and in the video frame sequence to be encoded, a first frame is an I-frame, an intermediate frame is the B-frame, and a last frame is a P-frame.

8. A method for training a model, comprising:
selecting a group of pictures (GOP) length sample corresponding to a video frame sample in a target video frame sequence sample from at least two first preset GOP lengths;
obtaining label data of the video frame sample, based on the GOP length sample corresponding to the video frame sample, comprising:
determining the label data based on the GOP length sample and a mapping relationship between a value and a GOP length established in advance; or
directly taking the GOP length sample as the label data; and
taking a preset characteristic of the video frame sample and the label data of the video frame sample as training data, wherein the training data is used to train the model to obtain a first target model; wherein a type set of the preset characteristic comprises at least one of:
an intra cost of a given frame,
a quantity of intra blocks of the given frame,
an intra cost of another frame associated with the given frame, or
a quantity of intra blocks of the other frame associated with the given frame.

9. The method of claim 8, wherein the preset characteristic is obtained by sifting from a plurality of characteristics based on a characteristic value of the plurality of characteristics; and
the characteristic value of the plurality of characteristics is obtained by inputting the plurality of characteristics to a second target model.

10. The method of claim 8, further comprising:
encoding the target video frame sequence sample with starting from the video frame sample based on the at least two first preset GOP lengths, to obtain at least two pieces of first encoding characteristic information; and
selecting target encoding characteristic information from the at least two pieces of first encoding characteristic information,
wherein selecting the GOP length sample corresponding to the video frame sample in the target video frame sequence sample from the at least two first preset GOP lengths comprises:
selecting a preset GOP length corresponding to the target encoding characteristic information from the at least two first preset GOP lengths as the GOP length sample corresponding to the video frame sample.

11. The method of claim 10, wherein a first encoding characteristic information of the at least two pieces of first encoding characteristic information is obtained based on relevant information of a B-frame and/or P frame in the target video frame sequence sample, and the first encoding characteristic information comprises at least one of:
a code rate, peak signal to noise ratio, PSNR, structural similarity, SSIM, or video multimethod assessment fusion, VMAF, of the B-frame in the target video frame sequence sample; or
a code rate, PSNR, SSIM, or VMAF of the P-frame in the target video frame sequence sample.

12. An electronic device, comprising:
at least one processor; and
a memory connected in communication with the at least one processor;
wherein the memory stores an instruction executable by the at least one processor, and the instruction, when executed by the at least one processor, enables the at least one processor to execute the method of claim 1.

13. An electronic device, comprising:
at least one processor; and
a memory connected in communication with the at least one processor;
wherein the memory stores an instruction executable by the at least one processor, and the instruction, when executed by the at least one processor, enables the at least one processor to execute the method of claim 8.

14. A non-transitory computer-readable storage medium storing a computer instruction thereon, wherein the computer instruction is used to cause a computer to execute the method of claim 1.

15. A non-transitory computer-readable storage medium storing a computer instruction thereon, wherein the computer instruction is used to cause a computer to execute the method of claim 8.

* * * * *